Figure 1:
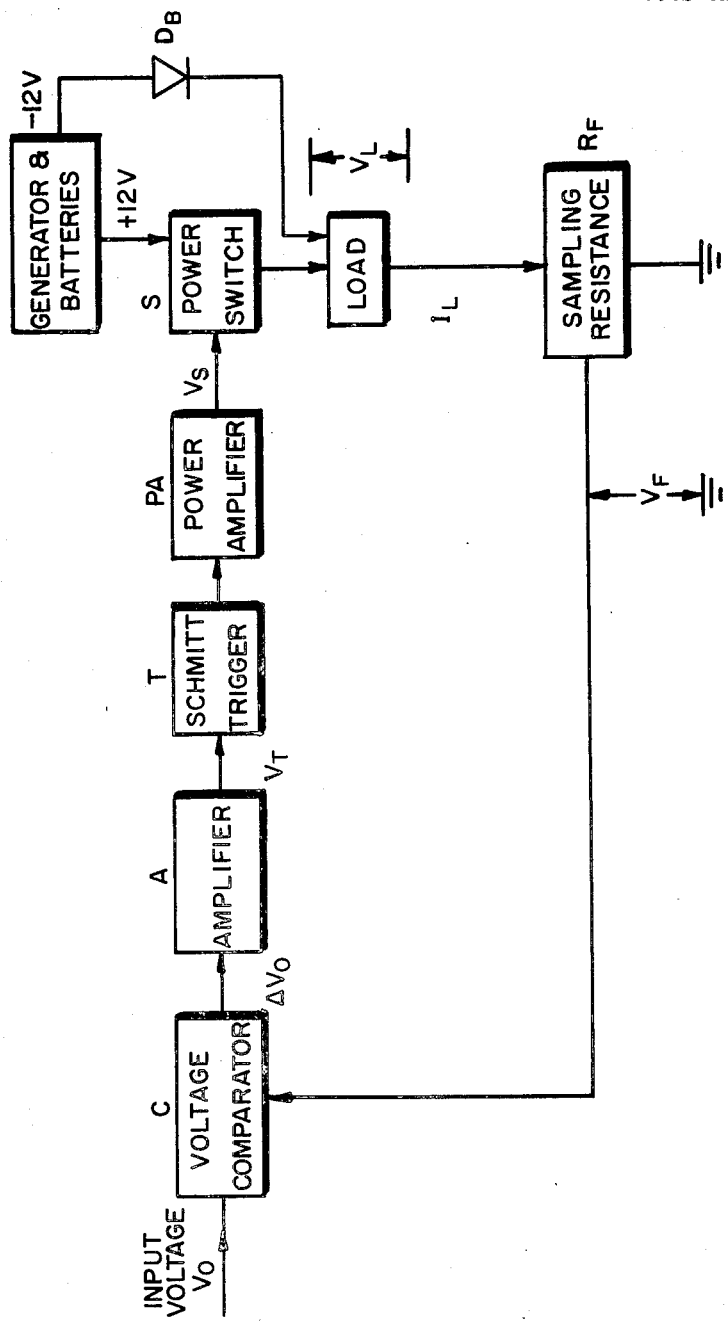

INVENTOR.
JESSE R. KARP
LEO SIMPSON
SAUL ROMAN
ATTORNEYS

INVENTOR.
JESSE R. KARP
LEO SIMPSON
SAUL ROMAN
BY Moses Nolte & Nolte
ATTORNEYS

INVENTOR.
JESSE R. KARP
LEO SIMPSON
SAUL ROMAN
BY Moses Nolte & Nolte
ATTORNEYS

United States Patent Office 3,237,088
Patented Feb. 22, 1966

3,237,088
CURRENT REGULATOR FOR INDUCTIVE LOADS
Jesse R. Karp, New Rochelle, Leo Simpson, New York, and Saul Roman, Brooklyn, N.Y., assignors to Maxson Electronics Corporation, New York, N.Y., a corporation of New York
Filed Aug. 17, 1961, Ser. No. 132,118
1 Claim. (Cl. 323—22)

This invention relates to regulating devices, and particularly to a novel highly efficient electronic regulator for inductive loads.

The usual method for controlling or regulating the curent in a load is to insert a variable element in series with the load, which is used to take up any difference between the available voltage and that necessary to sustain the desired value of current. Alternatively, a variable element may be placed in parallel with the load in order to take up any difference between the available current and the desired value of current in the load. The control element which is used to compensate for changes in the load impedance and/or the available current or voltage, may be an adjustable resistor, or a tube, transistor, or other controllable device. The degree of control is limited by the ability of the controlling device to dissipate large amounts of power. It is also limited by the ability of the source to supply the total necessary power density. A second factor militating against the use of these circuits is that the power loss in the control element reduces the efficiency of the regulating circuit.

Another factor must be considered when the load is inductive. It is then necessary, in addition to providing accurate control of current, to also rapidly change from one current level to another. In this case, the rate of change of current is limited to the terminal voltage across the load divided by the inductance. Therefore, in order to obtain rapid changes, a large voltage must be available. When the current reaches the desired value, the voltage across the load inductor must be reduced to exactly the amount of the IR drop in the load in order to sustain a constant load current. The difference between the available voltage and the load voltage necessary to sustain this current must then be dropped across the series resistances of the control element, or across the output resistance of the power supply. This large voltage drop results in low overall efficiency.

In many applications where the current must be controlled in an inductive load, such as in the switching of microwave ferrite phase shifters, the value of current must be changed frequently between one value and another. The energy which is used to increase the value of load current is stored in the magnetic field of the inductor. Generally, when the current is subsequently reduced to a lower value, the inductive energy previously stored in the magnetic field is dissipated across a resistance in the circuit or power supply, which again causes losses and inefficiency.

It is, therefore, the principal object of the present invention to provide an efficient regulator of average current in an inductive load.

The present device utilizes a transistor switch to rapidly open and close the connection of a power supply to an inductive load to regulate the average direct current. Since inductor current cannot change instantaneously, the load current is made to rise and fall about a derised direct voltage input reference value. A feedback network determines the change from the reference to control the switch. The switch makes available large voltages to meet the requirements for rapidly changing high inductive load currents while avoiding large quiescent power losses. When current decreases during the open switch condition the energy from the inductive load is stored in a battery and reutilized when the load is again connected. When multiple loads are employed, some energy may be transferred directly between inductors. High efficiency is obtained due to the switching action, since either current or voltage are zero under ideal conditions. Only small actual losses result from the finite time it takes for the switch to open or close.

Figure 2:
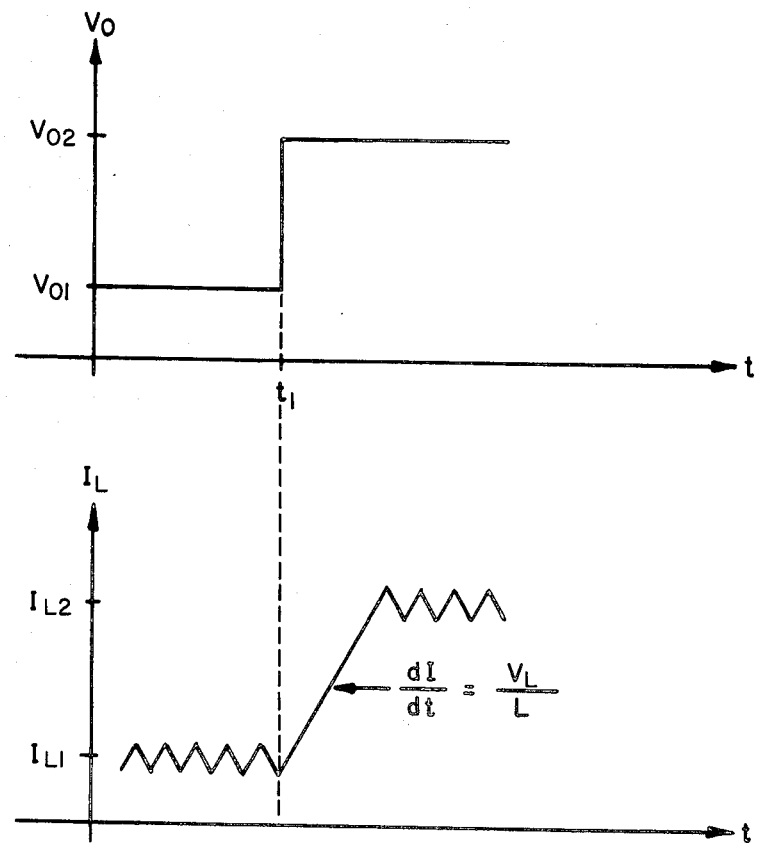
Figure 3:
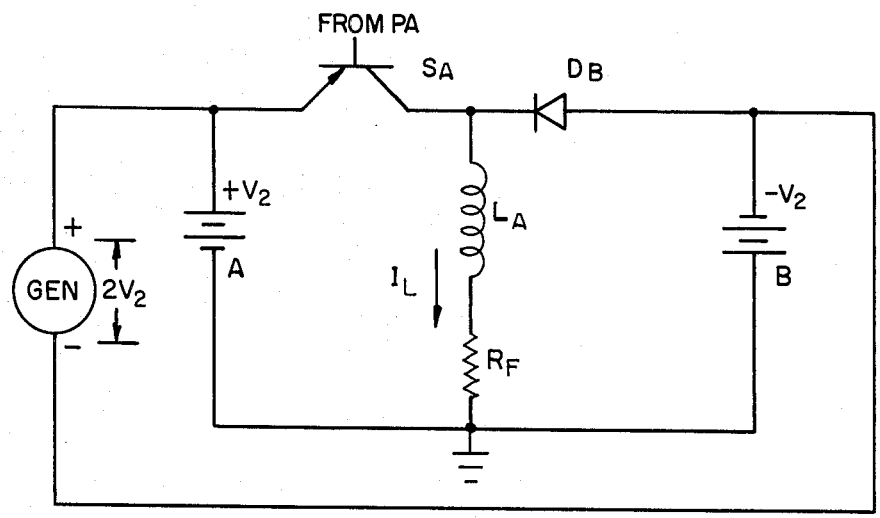
Figure 4:
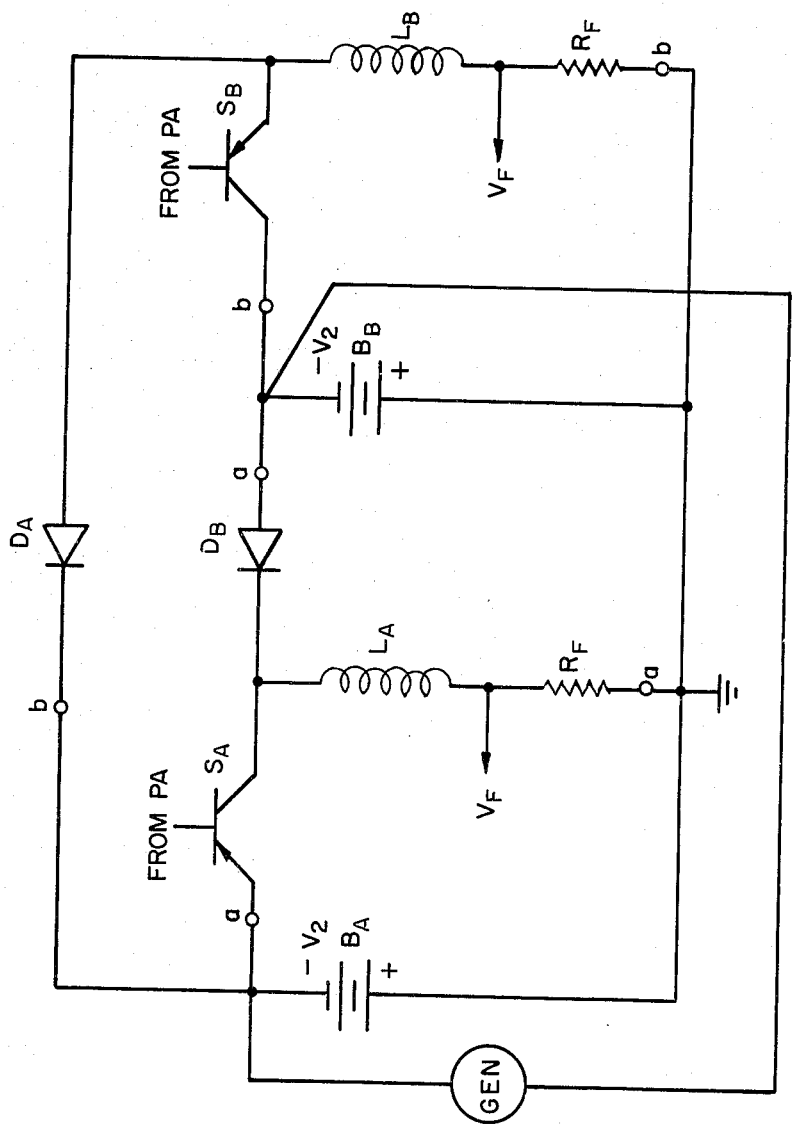
Figure 5:
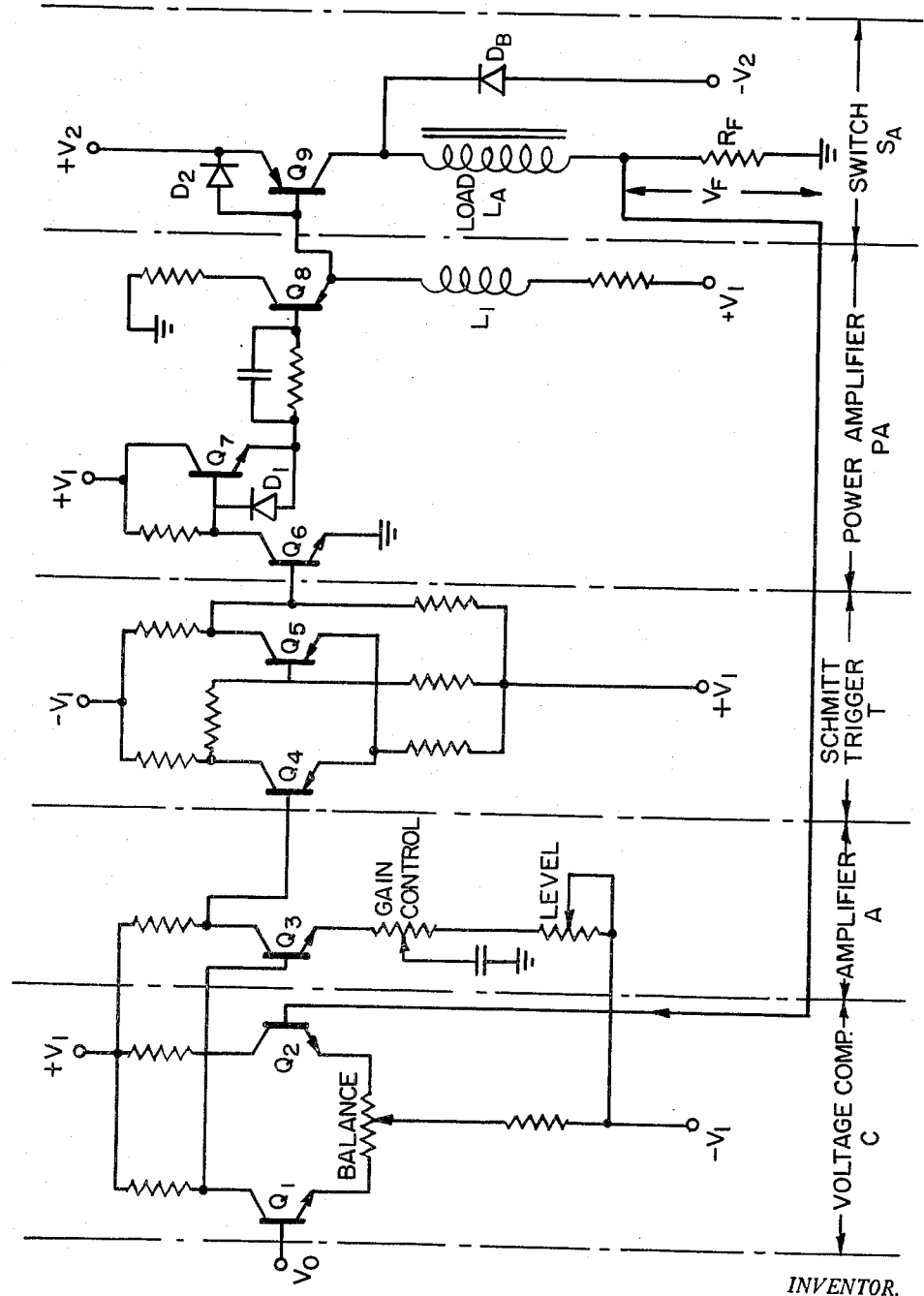
Figure 6:
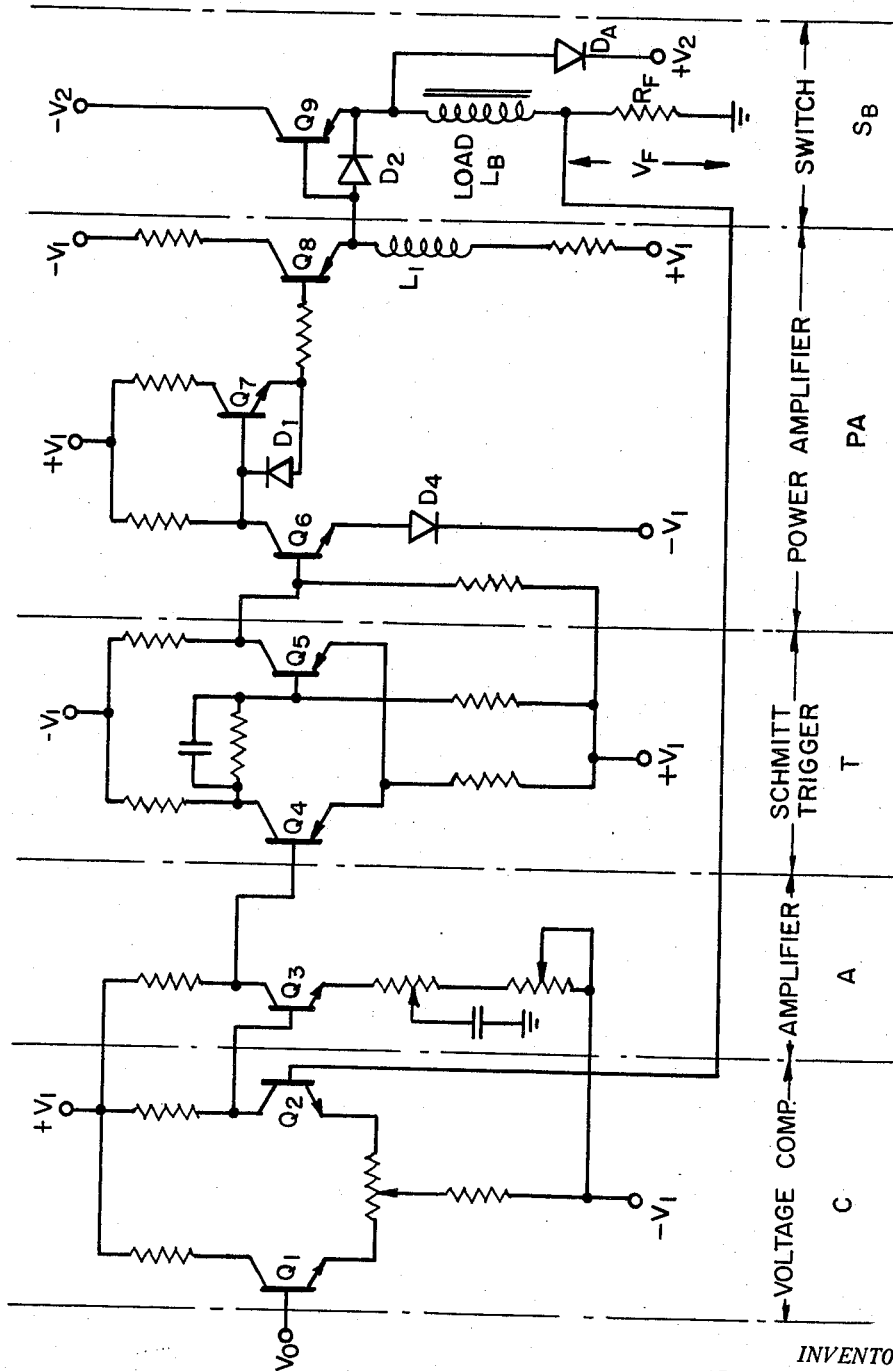

The invention will be more fully understood and other objects and advantages will become apparent in the following description and accompanying drawings, in which:

FIG. 1 shows a block diagram of the regulating circuit;
FIG. 2 shows current and voltage curves illustrating the operation of the device;
FIG. 3 shows the novel load switching circuit;
FIG. 4 shows the load switching circuit incorporating two inductive loads; and
FIGS. 5 and 6 show the detailed circuitry of symmetrically operated complementary configurations for controlling a plurality of loads.

As shown in FIG. 1, an input voltagt $V_0$ determines the magnitude $I_L$ of the current in the load, by controlling the operation of the power switch S, which preferably utilizes a transistor. The power for $I_L$ is provided by batteries and a generator. Twelve volt batteries are shown, but other configurations may utilize other values.

The circuit operation may be understood by referring to the waveform diagram given in FIG. 2. During the time between zero and $t_1$ the input voltage is $V_{01}$. The load current increases with a time constant $L/R_{eff}$ toward the value corresponding to the voltage $V_L$ across the load, and is approximately equal to the battery voltage, V. $R_{eff}$ is the total effective circuit resistance, consisting of a sampling resistance $R_F$, and the resistance in the switch, induction, and battery. $R_{eff}$ may be a fraction of an ohm.

Under control of the power switch, the current from the battery flows through the power switch, the load, and the sampling resistor $R_F$. The purpose is that the current in the load should increase or decrease in proportion to the control or input voltage $V_0$. To maintain this relation, it is necessary to sample the load current for comparison with the desired value of load current as represented by an equivalent control voltage. The sampling resistor $R_F$, of a fixed value, is therefore provided in series with the load.

The current $I_L$ flowing through $R_F$ produces a feedback voltage $V_F$. When $R_{eff}$ is small, $I_L$ rises almost linearly at a rate proportional to the load voltage and inversely with the inductance L, until the feedback voltage $V_F$ exceeds the control voltage $V_0$ by a small amount $\Delta V_0$. The voltages are then compared in voltage comparator C and the difference appears amplified as a trigger voltage $V_T$ at the output of the amplifier A. When $V_T$ is larger than the bias of the Schmitt trigger T by a small amount, the Schmitt trigger circuit fires. This causes the power amplifier PA output voltage $V_S$ to bias the power switch transistor and thus open the switch S, which removes the voltage $V_L$ from across the load.

$I_L$ and $V_F$ then decrease until $V_F$ is less than $V_0$ by an amount $\Delta V_0$. The process is thereby reversed, wherein an opposite polarity signal causes S to close, and $I_L$ again begins to increase. $I_L$ therefore fluctuates in a sawtooth fashion about a value determined by $V_0$. At the time $t_1$, $V_0$ is increased from $V_{01}$ to $V_{02}$, and $I_L$ simply increases to a new average value, as shown in FIGURE 2.

In the above description, the current in the load $I_L$ was taken to either increase or decrease without considering the energy source or sink. By referring to FIGURE 3, it can be seen that the energy in the load $L_A$ comes from battery A, since the voltage $V_2$ is applied in series with transistor switch $S_A$, the load $L_A$, and the sampling resistor $R_F$. Battery A supplies enough energy to overcome the dissipation in the circuit due to $R_{eff}$ and to develop the inductive field in $L_A$. When the load current $I_L$ is decreased, as in the negative going portion of the sawtooth cycle, or when the load current is decreased from a high to a lower value, the transistor switch $S_A$ is open, and the collapsing magnetic field forces the current to flow into the ground terminal of battery B and from the minus terminal of B through holdoff diode $D_B$, and back into the load $L_A$. This is so because the current in the inductive load cannot change instantaneously. Therefore, except for dissipation in the effective circuit resistance $R_{eff}$, the magnetic energy stored in the load L is returned to battery B when the current $I_L$ decreases. Thus, under ideal zero circuit resistance conditions, all of the energy supplied to battery A is eventually returned to battery B.

In the case of FIGURE 3, a 24-volt generator is utilized on which are floated two 12-volt batteries in series, with the midpoint grounded. A single load $L_A$ is connected through the switch $S_A$ across battery A, which may be referred to as the +battery and its voltage as $+V_2$. This figure shows only the transistor of the power switch, but each load is part of an independent unit referred to as a driver, containing all the other system elements except the generator and batteries, which are common to all loads. Plus and minus $V_1$ are separate power sources for the other elements. As indicated above, the load current fluctuates within narrow limits about the nominal value, even though the control voltage $V_0$ is constant. For a fluctuation which is an increase, energy is drawn from battery A, and if the fluctuation is a decrease, energy is put into battery B. Therefore, a single driver will always drain power from battery A and supply power to battery B.

A similar situation would exist for several similar type loads and drivers connected to battery A, but by making use of a complementary group of drivers and loads connected so that they drain power from battery B and supply power to battery A, we obtain a balance of energy. This condition will exist even though the control voltages to all the drivers are kept constant. Therefore, the system dissipates a minimum amount of power.

In order to fully utilize the control circuit it is, therefore, desirable to control multiple inductive loads. In this case the circuit is arranged as shown in FIGURE 4, with half the loads being connected across battery A, and the remaining loads across battery B. The inductive energy stored in all loads $L_A$ is thus transferred to battery B whenever the load current $I_{LA}$ is decreased by the opening of switch $S_A$. Similarly, the collapsing fields in loads $L_B$ cause currents to flow through diode $D_A$ into the positive terminal of battery A and the energy is once again conserved.

Under certain conditions the load current $I_{LA}$ may be increasing while the load current $I_{LB}$ is decreasing, or vice versa. In this case the load current of one load can flow partially into the other inductive load and some of the energy is transferre ddirectly from one inductor to another by the closed switch without going through the battery. In one such system, a number of drivers can be operated simultaneously, such as an inertialess scanning radar antenna. For a given beam pointing direction, a specific distribution of currents is required, and the energy conservation technique will result in a minimum overall power dissipation. As the beam is slewed, however, to a new position, a new distribution of current values is required which may result in excessively high surge current. This problem is minimized since the change in direction represents an equal number of increasing and decreasing currents inherent in the linear properties of the antenna. The high surge current can therefore be directly transferred from one load to the next by nature of the overall configuration.

The efficiency of the battery as an energy storage device is a function of the frequency of the charge-discharge cycle. When the current supplied by the battery is reversed at a rapid rate, there is no time for a polarization charge to accumulate in the vicinity of the battery electrodes and the energy conservation in the battery approaches 100%. The approximate formula for the efficiency of the battery as an energy storage device is given by the formula:

$$E_{ff} = \frac{V \text{ discharge}}{V \text{ charge}} = \frac{V_{av} - I_{av}R_{bat}}{V_{av} + I_{av}R_{bat}}$$

Thus, it may be seen that if the voltage of the battery is maintained constant, the efficiency is ideally 100%. The higher the fluctuation frequency the more closely this relationship holds true. When the sawtooth frequency is between 1000 and 10,000 cycles per second, the formula is almost exactly true. At lower frequency, the efficiency approaches 60 to 70%, which is the D.C. value.

Generator G is used to supply sufficient energy to overcome all resistive losses in the circuit and to maintain batteries A and B at a constant voltage.

To achieve completely symmetrical operation, two complementary circuit configurations are employed. The requirement of two types of circuits can be readily understood by referring to the output circuit configurations, as shown in FIGURES 4, 5 and 6. In the circuit of FIGURE 5, the load inductor is connected to the collector of $Q_9$, while in FIGURE 6, the load inductor is connected to the emitter of $Q_9$. This imposes different base drive requirements for the two types of switch circuits which are satisfied by the two types of power amplifiers shown in each figure.

Since $V_F$ is a positive going voltage in the case of FIGURE 5 and negative going in FIGURE 6, the required individual input voltages must be of equivalent polarity to permit the same voltage comparators, amplifiers, and Schmitt triggers to be used in both circuits. Proper phasing is obtained by selecting the appropriate collector to the difference amplifier (comparator) as the input to the following amplifier. Thus, in FIGURE 5 the first collector is connected to the amplifier base, while in FIGURE 6 the second collector electrode is utilized.

Transistors $Q_1$ and $Q_2$ comprise the voltage comparator (C) which compares the input voltage $V_0$ and the feedback voltage $V_F$, while transistor $Q_3$ functions as an amplifier (A) and level converter. $Q_4$ and $Q_5$ are part of the Schmitt trigger circuit (T). Transistors $Q_6$ and $Q_7$ result in symmetrical power drive to $Q_8$ (PA) which is the amplifier or power drive to the output switch $Q_9$ (S).

Diodes $D_A$ and $D_B$ permit the collapsing magnetic field in the respective loads to charge the alternate power supply battery. Diode $D_1$ is provided so that during turn-on of $Q_8$, there will be a low impedance drive path through $Q_6$. During turn-off of $Q_8$ and $Q_6$, transistor $Q_7$ provides the necessary turn-off drive while $D_1$ is back-biased.

High frequency transistors have a low breakdown voltage between the emitter and the base. When $Q_9$ is turned off, its base voltage is more positive than the emitter voltage and the base-emitter junction is subject to possible breakdown. $D_2$ is, therefore, connected at this junction and so poled that the voltage across that junction never exceeds the breakdown voltage of the diode, which is below the amount that would harm the transistor. During turn-on, it is back-biased and has no effect.

The function of $D_4$ in FIGURE 6 is to set up the necessary D.C. bias level on $Q_6$ such that when the Schmitt trigger is in the OFF state, with $Q_5$ being cut off, the voltage impressed at the base of $Q_6$ is more negative than the emitter voltage, thus, resulting in cut off. At the same time, it presents a low impedance path to $Q_6$ during turn-on.

The function of the coil $L_1$ in FIGURES 5 and 6 is to supply energy and thus expedite the cut off of $Q_8$ when the feedback voltage exceeds the control voltage.

It may thus be seen that the present device may be employed in many applications, as an efficient regulator for inductive loads requiring large amounts of current. The nominal maximum value of current for one such device as constructed is 6 amperes. By suitable changes of the output circuit, many times this amount of current may be regulated.

Current control may be provided for large numbers of electromagnetic devices, such as microwave ferrite phase shifters used with electronically steerable antennas. In this manner the programming of the phase shifters can be efficiently accomplished with rapid change from one current program to another.

While several embodiments have been illustrated, it is apparent that the invention is not limited to the exact forms or uses shown and that many other variations may be made in the particular design and configuration without departing from the scope of the invention as set forth in the appended claim.

What is claimed is:

A current regulating device comprising an inductive load means having a predetermined rate of change of current therethrough, direct voltage supply means, said current rate of change being dependent upon the inductance of said load and said direct voltage supply, switch means connected between said direct voltage means and said load means, feedback means connected to said load means to provide a direct voltage output signal proportional to said current, means applying an input reference voltage, means for comparing said input and output voltages to produce a difference voltage, trigger means actuated by said difference voltage to produce a trigger signal, means applying said trigger signal to said switch to disconnect said load from said direct voltage supply upon the occurrence of an output voltage greater than said reference voltage and permit said current and output voltage to decrease and thereafter to reconnect said load when said output voltage falls below said reference, direct voltage storage means for storing current from said load during the disconnection of said direct voltage supply means, and unidirectional conduction means connecting said storage means to said load.

References Cited by the Examiner

UNITED STATES PATENTS

| | | | |
|---|---|---|---|
| Re. 24,671 | 7/1959 | Jensen | 323—22 |
| 2,776,382 | 1/1957 | Jensen | 323—22 |
| 2,810,105 | 10/1957 | Henrich | 323—4 X |
| 2,969,498 | 1/1961 | Stenudd | 323—22 |
| 3,008,082 | 11/1961 | Schlicher | 322—73 |
| 3,044,006 | 7/1962 | Barnard | 322—28 |
| 3,076,922 | 2/1963 | Seike | 322—28 |
| 3,121,837 | 2/1964 | Holm et al. | 322—73 |

FOREIGN PATENTS 872,776    7/1961    Great Britain.

LLOYD McCOLLUM, *Primary Examiner.*